United States Patent Office

Re. 24,669

Reissued July 21, 1959

24,669

COLOR STABILIZERS FOR TALLOW

Robert J. Hlavacek, Clarendon Hills, Ill., assignor to Swift & Company, Chicago, Ill., a corporation of Illinois No Drawing. Original No. 2,680,121, dated June 1, 1954, Serial No. 239,840, August 1, 1951. Application for reissue May 22, 1956, Serial No. 586,630

6 Claims. (Cl. 260—398.5)

Matter enclosed in heavy brackets [ ] appears in the original patent but forms no part of this reissue specification; matter printed in italics indicates the additions made by reissue.

The present invention relates in general to a method for stabilizing fatty materials, and more particularly to a method for retarding the color reversion of inedible fatty materials such as decolorized tallow or the like by the incorporation therein of compounds containing an activated sulfhydryl group.

The use of propane or other liquefied, normally gaseous hydrocarbons such as ethane, butane or mixtures thereof, to remove colored impurities from fats and fatty acids is known to the prior art and has been described in U.S. Patents 2,118,454; 2,219,652; 2,383,535 and 2,367,-671. Essentially the process comprises dissolving the fatty material under pressure in several volumes of a liquefied, normally gaseous hydrocarbon maintained at elevated temperatures and pressures whereby two phases are formed—the lighter phase containing the decolorized fatty material and the heavier or lower phase containing color bodies and tarry impurities. The upper phase is removed and the hydrocarbon separated from the fatty material by means of distillation to produce a decolorized product. Preferably, the process is carried out as a continuous countercurrent process for most efficient results.

It has been found that when a fat such as tallow or the like is decolorized by treatment with a liquefied, normally gaseous hydrocarbon, it has a pronounced tendency to darken or color-revert appreciably when kept hot and exposed to air. This has proven to be a definite drawback to the use of this type of decolorizing treatment. Normal fat antioxidants added to the fatty material after decolorization do not materially improve the color reversion situation. A major reason for the ineffectiveness of antioxidants in general as color stabilizers is due to the fact that oxidation is only a small part of color reversion. Antioxidants, in general, are of little value as color stabilizers, and the stabilization against color reversion of low grade fats which have been decolorized by treatment with a liquefied, normally gaseous hydrocarbon presents a much more difficult problem than the stabilization of a high grade fat to oxidation.

The present invention has as its object the provision of a method for inhibiting or retarding the color reversion of fatty materials which have been decolorized by treatment with a liquefied, normally gaseous hydrocarbon.

Additional objects if not specifically set forth herein will be readily apparent to one skilled in the art from the following detailed description of the invention:

It has been discovered that the color reversion of fatty materials which have been decolorized with a liquefied, normally gaseous hydrocarbon such as propane, butane, ethane or the like, can be effectively retarded by the addition to such fatty materials of small amounts of a compound containing an activated sulfhydryl group. The activation may be from either a carboxyl group, a hydroxyl group, or an aromatic ring. This phenomenon is characteristic of sulfhydryl sulfur only, since sulfides, disulfides, sulfones, sulfoxides, sulfonic acids, sulfinic acids and sulfites do not retard color reversion. A free, activated sulfhydryl group is necessary, i.e. a transient sulfhydryl group formed by enolization is not effective.

Examples of such compounds having an activated sulfhydryl group (—SH) are B-mercaptopropionic acid, benzyl mercaptan, thiophenol, thio-p-naphthol, thioglycollic acid, p-thiocresol, 2-mercaptoethanol and the like. These and all other compounds tested containing a free sulfhydryl group activated by an aromatic ring, a hydroxyl group, or a carboxyl group, have been found to very effectively retard the tendency of fatty materials, decolorized by treatment with a liquefied, normally gaseous hydrocarbon, to color revert.

The amounts of inhibitor required to effect stabilization of the decolorized fatty material will vary both with the particular inhibitor used and also with the type of fatty material to be stabilized. However, it has been found that in all cases, amounts of the inhibitors of the present invention ranging from about 0.3 percent to about 1.0 percent by weight of the fatty material will effectively and completely inhibit color reversion of the fatty material. The fatty material so treated will remain color-stable for at least one month even when held at elevated temperatures, e.g. 140°–150° F.

Although considered applicable to the treatment of any fatty material which it may be desired to decolorize, the invention finds particular applicability to the treatment of decolorized fatty materials from low grade sources and to the treatment of inedible fatty materials. Examples of such materials are yellow grease, inedible tallow, tallow fatty acids, cottonseed fatty acids, soybean fatty acids and the like.

In practicing the present invention, it is desirable that the stabilizers or inhibitors be added to the fatty material promptly after decolorization. Preferably the stabilizers are added through a proportioning pump or the like as the fatty material leaves the decolorizing operation.

The following table, which is furnished for the purpose of illustration only and which is not intended to restrict the scope of the present invention, shows the length of time for which propane decolorized fatty materials, treated in accordance with the method of the present invention, remained color-stable when held at a temperature productive of accelerated color reversion. In each case, the stabilizer was added to the fatty material as it left the decolorizing operation.

| Propane Decolorized Fatty Material | Stabilizer | Percent Added | Days Color-Stable at 140° F. |
|---|---|---|---|
| Inedible tallow | Benzyl mercaptan | 0.7 | 27 |
| Do | B-mercaptopropionic acid. | 0.7 | 27 |
| Do | Thioglycollic acid | 0.7 | 27 |
| Do | Thio-B-napthol | 0.7 | 27 |
| Do | Thiophenol | 0.3 | 31 |
| Do | p-Thiocresol | 0.3 | 31 |
| Do | 2-mercaptoethanol | 0.5 | 30 |
| Cottonseed fatty acids | B-mercaptopropionic acid. | 1.0 | 31 |
| Do | Thiophenol | 1.0 | 31 |
| Do | p-Thiocresol | 1.0 | 31 |
| Do | Benzyl mercaptan | 1.0 | 31 |
| Tallow fatty acids | 2-mercaptoethanol | 1.0 | 29 |

The percentages in the above table are based on the weight of the fatty material treated, and do not represent the minimum amounts of stabilizer which may be used. As indicated above, percentages of stabilizer within the range 0.3 percent to 1.0 percent by weight have been found to be effective in all cases.

The color stability of the fatty materials listed in the table when stored at 140°–150° F. without the addition of any stabilizer ranges from 1 to 7 days. The exact time varies with the particular fatty material but in all cases comes within the above range.

While the foregoing table has illustrated the treatment of propane decolorized fatty materials, the invention is also applicable to the treatment of fatty materials which have been decolorized by any other liquefied, normally gaseous hydrocarbon such as ethane, butane or the like.

The term "fatty materials" as used herein is intended to cover all vegetable and animal fats which are normally decolorized such as tallow, tallow fatty acids, yellow grease, cottonseed fatty acids, soybean fatty acids and the like.

Obviously, many modifications and variations of the invention hereinbefore set forth may be made without departing from the spirit and scope thereof, and therefore only such limitations should be imposed as are indicated in the appended claims.

I claim:

[1. A method for retarding the color reversion of fatty materials which comprises: subjecting said fatty materials to a decolorization treatment with a liquefied, normally gaseous hydrocarbon; and thereafter incorporating in said decolorized fatty materials a small amount of a compound containing as the only sulfur group an activated sulfhydryl group.]

[2. A method as in claim 1, wherein the compound containing an activated sulfhydryl group is present in an amount ranging from about 0.3 percent to about 1.0 percent by weight of the fatty material.]

[3. A method for retarding the color reversion of fatty materials which have been decolorized by treatment with a liquefied, normally gaseous hydrocarbon which comprises: incorporating in said decolorized fatty materials a small amount of a compound selected from the group consisting of compounds containing as the only sulfur group a sulfhydryl group activated by an aromatic ring, compounds containing as the only sulfur group a sulfhydryl group activated by a hydroxyl group, and compounds containing as the only sulfur group a sulfhydryl group activated by a carboxyl group.]

[4. A method for retarding the color reversion of fatty materials which comprises: subjecting said fatty materials to a decolorization treatment with a liquefied, normally gaseous hydrocarbon; and thereafter incorporating in said decolorized fatty materials a small amount of a compound containing as the only sulfur group a sulfhydryl group activated by an aromatic ring.]

[5. A method as in claim 4 wherein the compound containing the activated sulfhydryl group is present in an amount ranging from about 0.3 percent to about 1.0 percent by weight of the fatty material.]

6. A method for retarding the color reversion of fatty materials which comprises: subjecting said fatty materials to a decolorization treatment with a liquefied, normally gaseous hydrocarbon; and thereafter incorporating in said decolorized fatty materials a small amount of a compound containing as the only sulfur group a sulfhydryl group activated by a hydroxyl group.

7. A method as in claim 6 wherein the compound containing the activated sulfhydryl group is present in an amount ranging from about 0.3 percent to about 1.0 percent by weight of the fatty material.

8. A method for retarding the color reversion of fatty materials which comprises: subjecting said fatty materials to a decolorization treatment with a liquefied, normally gaseous hydrocarbon; and thereafter incorporating in said decolorized fatty materials a small amount of a compound containing as the only sulfur group a sulfhydryl group activated by a carboxyl group.

9. A method as in claim 8 wherein the compound containing the activated sulfhydryl group is present in an amount ranging from about 0.3 percent to about 1.0 percent by weight of the fatty material.

*10. A method for retarding the color reversion of fatty materials which comprises: subjecting said fatty materials to a decolorization treatment with a liquefied normally gaseous hydrocarbon; and thereafter incorporating in said decolorized fatty material a small amount of thioglycollic acid.*

*11. A method for retarding the color reversion of fatty materials which comprises: subjecting said fatty materials to a decolorization treatment with a liquefied normally gaseous hydrocarbon; and thereafter incorporating in said decolorized fatty material a small amount of B-mercaptopropionic acid.*

References Cited in the file of this patent or the original patent

UNITED STATES PATENTS

| | | |
|---|---|---|
| 2,397,960 | Gribbins et al. | Apr. 9, 1946 |
| 2,680,121 | Hlavacek | June 1, 1954 |